Jan. 21, 1947.  F. W. SLACK ET AL  2,414,674
VEHICLE WHEEL SUSPENSION
Filed Feb. 19, 1945
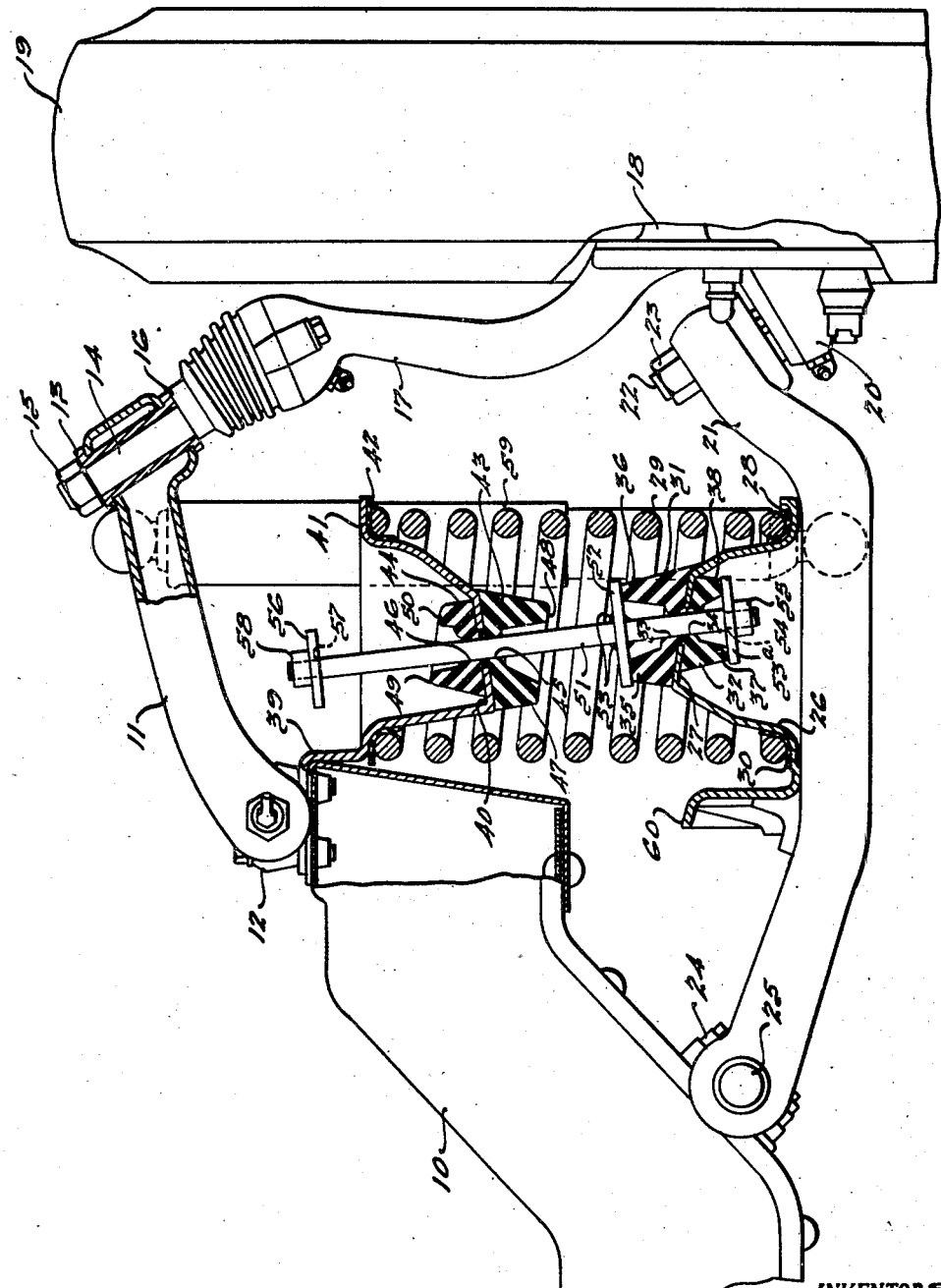
INVENTORS.
Frederic W. Slack
Chester C. Utz
BY
Harness and Harris
ATTORNEYS.

Patented Jan. 21, 1947

2,414,674

UNITED STATES PATENT OFFICE 2,414,674

VEHICLE WHEEL SUSPENSION

Frederic W. Slack, Detroit, and Chester C. Utz, Magnolia, Mich., assignors to Chrysler Corporation, Highland Park, Mich., a corporation of Delaware Application February 19, 1945, Serial No. 578,865

13 Claims. (Cl. 267—20)

1

This invention relates to a vehicle suspension. More specifically it relates to a resilient bumper construction adapted for use with links connecting a vehicle frame and steerable wheels therefor.

In constructions involving links connected at one end to a vehicle frame and at the other end to a wheel, it is a problem to provide appropriate stops limiting the movement of the wheel and the links with respect to the frame in two directions. We have devised a construction involving resilient stops acting to limit the above movement and have appropriately associated these stops with springs in the suspension of the vehicle frame upon the links.

An object of the present invention is to provide resilient bumpers for limiting movement of suspension parts with respect to a vehicle frame. Such bumpers may be employed with links connected to the forward portion of a vehicle frame with steerable wheels.

Another object relates to improvements in the association with resilient suspension means for a vehicle frame of a bumper construction for limiting with respect to the vehicle frame the movement of ground wheels connected with the frame through the suspension means.

A further object is to provide means for limiting the movement of a ground wheel in two directions, which means involves resilient bumpers providing a relatively small resistance for a certain portion of the movement and a relatively great resistance for another portion of the movement.

Other objects will appear from the disclosure.

The single figure of the drawing is a fragmentary view partially in section showing the suspension of the front end of a vehicle frame upon a front wheel. Reference character 10 designates a vehicle frame to which is pivotally connected an upper link 11 by means of a bracket structure 12. The end of the link 11 connected to the vehicle frame 10 may be forked so as to extend on opposite sides of the bracket 12, a pin carried in the bracket structure 12 extending through the forked ends of the link 11. The other end of the link 11 is provided with a bushing 13 in which is secured a stud 14 by means of a nut 15. The stud has a shoulder 16 engaging one end of the bushing 13 and the nut 15 at the other end of the stud 14 cooperates with the shoulder 16 to hold the stud as shown. The stud 14 has a ball portion, not shown, forming part of a universal joint joining the outer end of the link 11 with the upper end of a wheel-carrying part 17, which has a spindle

2 portion 18 on which is rotatably mounted a steerable ground wheel 19. The lower end of the wheel-carrying part 17 is connected by a universal joint 20 to a lower link 21 by means of a stud 22. The stud 22 is secured to the outer end of the link 21 by a nut 23 in a manner similar to that shown for securement of the stud 14 to the link 11 by the nut 15. The other end of the lower link 21 may be forked so as to extend upon opposite sides of a bracket structure 24 providing a pivot 25 for the link 21 upon the vehicle frame 10.

Attached to the upper side of the link 21 is a member 26, cupped to provide a central portion 27 displaced upwardly from a surrounding portion 28 which serves as a seat for the lower end of a coil spring 29. The non-metallic ring 30 is placed between the lower end of the coil spring 29 and the seat 28 on the member 26. The central portion 27 of the member 26 has an opening, and resilient bumpers 31 and 32 are bonded to opposite sides of the central portion 27 around the opening in the portion 27. The bumpers 31 and 32 may be formed of a suitable material such as rubber. These bumpers are generally cup-shaped and are provided with openings 33 and 34 in their bases in registration with the opening in the portion 27 of the member 26. Portions of the bases of the bumpers 31 and 32 extend into the opening in the portion 27 into approximate meeting relation so as to form in effect a lining in the opening in the portion 27. The side walls of the bumpers 31 and 32 diminish in thickness in directions outward from the bases thereof. The height of the side wall of the resilient bumper 31 is relatively small at the side toward the pivot 25 as indicated at 35 and is relatively great at the opposite side as indicated at 36. Conversely, the height of the side wall of the bumper 32 is relatively great at the side toward the pivot 25 as indicated at 37 and is relatively small at the other side as indicated at 38.

A member 39 is attached to the vehicle frame by means of the bracket structure 12. Member 39 is cup-shaped and is provided with a central portion 40 forming the base of the cup and displaced from an outer portion 41 in a downward direction, that is in a direction toward the other member 26. The outer portion 41 serves as a seat for the upper end of the coil spring 29, a non-metallic ring 42 being positioned between the portion 41 and the upper end of the spring 29. Resilient bumpers 43 and 44, which may conveniently be formed of rubber, are bonded respectively to the inner side and to the outer side of the central portion 40 of the member 39 at an opening formed in the portion 40. Bumpers 43 and 44 are generally cup-shaped and have openings 45 and 46 formed in the base thereof in registration with the opening in the portion 40 of the member 39. The side walls of the bumpers 43 and 44 decrease in thickness in directions outward from the bases thereof. Portions of the bases of the bumpers 43 and 44 extend into the opening in the portion 40 of the member 39 into approximate meeting relation so as to provide in effect a lining for the opening in the portion 40. The height of the side wall of the bumper 43 toward the pivot 25 of the lower link 21 is relatively small as indicated at 47, and the height of the side wall at the other side is relatively great as indicated at 48. Conversely, the height of the side wall of the bumper 44 on the side toward the pivot 25 is relatively great as indicated at 49, and the height of the side wall at the other side is relatively small as indicated at 50.

A rod 51 extends through the bumpers 31, 32, 43, and 44 and the openings in the portions 27 and 40 of the members 26 and 39. A stop 52 in the form of a disk mounted upon the rod 51 and secured at an intermediate point thereto by soldering or welding as indicated at 53 engages the bumper 31. A stop 53a in the form of a disk rests against a shoulder 54 formed on the lower end of the rod 51 and is secured thereto by means of a nut 55. The stop 53 engages the bumper 32. By virtue of the engagement of the stops 52 and 53 with the resilient bumpers 31 and 43 there can be no axial movement of the rod 51 with respect to the member 26 except for that permitted by deformation of the bumpers 31 and 32. A stop 56 in the form of a disk rests against a shoulder 57 formed on the upper end of the rod 51 and is secured thereagainst by a nut 58.

A shock absorber 59 is connected at its lower end to the lower link 21 and at its upper end to the vehicle frame 10 by means not shown, since the shock absorber and its connections form directly no part of the present invention.

In normal operation the links 11 and 21 will be positioned with respect to the vehicle frame 10 as shown in the drawing. If forces are applied to the vehicle frame 10 or to the wheel 19, tending to move the links upwardly, this movement takes place only against the resistance of the spring 29 for a certain distance until the stop 52 comes into contact with the resilient bumper 43. It will be seen that first contact between the stop 52 and the bumper 43 is made only at the high side 48 of the bumper 43. Thus though additional resistance is provided toward further upward movement of the links 11 and 21, this resistance is relatively small. With further upward movement of the links resistance increases since the area of contact between the bumper 43 and the stop 52 increases until a condition of complete contact is reached, in which even the short side 47 of the bumper 43 is in contact with the portion of the stop 52 immediately over the short side 35 of the bumper 31. From this point on further upward movement of the links 11 and 21 takes place at a greater resistance. It will be noted that the member 26 has an upstanding portion 60 adapted to contact the under side of the vehicle frame 10 and thereby to provide a positive limit to the upward movement of the links 11 and 21.

If the links 11 and 21 move downwardly with respect to the vehicle frame 10, there is no resistance to such movement except in shock absorber 59 until the stop 56 engages the high side 49 of the resilient bumper 44. At this instant the area of contact between the stop 56 and the bumper 44 is small and the resistance is not great. Continued downward movement of the links 11 and 21 brings greater resistance to such movement, for the area of contact between the stop 56 and the bumper 44 increases to a point of completeness at which the stop 56 contacts even the low side 50 of the bumper 44.

It will be seen that, although the rod 51 fits closely within the openings 33, 34, 45, and 46 in the bumpers, it may have some lateral movement incident to movement of the links 11 and 21 with respect to the vehicle frame 10. When such lateral movement occurs the portions of the bumpers surrounding the openings therein must necessarily be deformed. The openings in the portions 40 and 27 of the members 39 and 26 which are larger than the diameter of the rod 51, provide a positive limit to the lateral movement of the rod.

We claim:

1. The combination with a vehicle frame and the lower link of a pair of links connected through one end to the frame and through the other end to a ground wheel, of means for limiting the movement of the pair of links with respect to the frame, said means comprising a first member mounted on the lower link and having an aperture, a first resilient mass formed of such a material as rubber and fastened at opposite sides of the first member at the opening, a second member mounted on the frame and having an aperture, a second resilient mass formed of a material such as rubber and fastened at opposite sides of the second member at the opening, a rod extending through the resilient masses and the apertures of the members, first and second stops associated with the rod and engaging the opposite ends of the first resilient mass for preventing axial movement of the rod with respect to the first member and the lower link except for movement permitted by deformation of the first resilient mass, and a third stop associated with the rod and engageable with the end of the second resilient mass away from the first member for limiting downward movement of the lower link, the one of the first and second stops positioned on the side of the first member toward the second member being engageable with the end of the second resilient mass toward the first member for limiting upward movement of the lower link.

2. The combination with a vehicle frame and a wheel-connected link pivotally attached to the vehicle frame, of means for limiting pivotal movement of the link with respect to the frame in two directions, said means comprising a first member attached to the link and having an opening, resilient bumpers mounted at the opening at opposite sides of the first member, a second member attached to the frame and having an opening, resilient bumpers mounted at the opening at opposite sides of the second member, a rod extending through the bumpers and the openings in the members, first and second stops on the rod engaging the ends of the resilient bumpers mounted at the first member for preventing axial movement of the rod with respect to the first member and the lower link except for movement permitted by deformation of the resilient bumpers on the first member, and a third stop on the rod engageable with the resilient bumper on the side of the second member away from the first member for limiting movement of the first member and the link in a direction away from the second member, the one of the first and second stops positioned on the side of the first member toward the second member being engageable with the resilient bumper on the side of the second member toward the first member limiting movement of the first member and the link in a direction toward the second member.

3. The combination with a vehicle frame and a wheel-connected link pivotally attached to the vehicle frame, of means for limiting pivotal movement of the link with respect to the vehicle frame in two directions, said means comprising a first member having an opening and being secured to the link, rubber bumpers mounted on the first member at the opening so as to line the opening and to project from opposite sides of the first member a second member having an opening and being secured to the vehicle frame, rubber bumpers mounted on the second member at the opening so as to line the opening and to project from opposite sides of the second member, a rod projecting through the bumpers on both members, first and second stops on the rod engageable with the ends of the bumpers on the first member for preventing axial movement of the rod with respect to the first member and the link except for movement permitted by deformation of the bumpers on the first member, and a third stop on the rod engageable with the end of the bumper on the second member away from the first member for limiting movement of the link and the first member in a direction away from the second member, the one of the first and second stops positioned on the side of the first member toward the second member being engageable with the resilient bumper on the side of the second member toward the first member limiting movement of the first member and the link in a direction toward the second member.

4. The combination with a vehicle frame and a wheel-connected link pivotally attached to the vehicle frame, of means for limiting pivotal movement of the link with respect to the vehicle frame in two directions, said means comprising means providing an apertured portion fixed against movement with respect to the link, resilient bumpers mounted at the apertured portion so as to extend from opposite sides thereof, means providing an apertured portion fixed against movement with respect to the vehicle frame, resilient bumpers mounted at the last mentioned apertured portion so as to extend from opposite sides thereof, a rod extending through the apertured portions and the bumpers, first and second stops on the rod engageable with the ends of the bumpers mounted in the apertured portions associated with the link for preventing axial movement of the rod with respect to the link except for the movement permitted by deformation of the last mentioned bumpers, a third stop on the rod engageable with the bumper mounted at the apertured portion associated with the vehicle frame on the side away from the apertured portion associated with the link for limiting movement of the link involving movement of the apertured portions away from one another, the one of the first and second stops positioned nearer the apertured portion associated with the frame being engageable with the bumper mounted at the apertured portion associated with the frame on the side toward the apertured portion associated with the link for limiting movement of the link involving movement of the apertured portions toward one another.

5. The combination with a vehicle frame member and a wheel-connected link member pivotally attached to the vehicle frame member, of means for limiting pivotal movement of the link member with respect to the frame member, said means comprising means providing a first apertured portion fixed against movement with respect to one member, resilient bumpers mounted at the first apertured portion so as to extend from opposite sides thereof, means providing a second apertured portion fixed against movement with respect to the other member, resilient bumpers mounted at the second apertured portion so as to extend from opposite sides thereof, a rod extending through the apertured portions and the bumpers, first and second stops on the rod engageable with the ends of the bumpers mounted at the first apertured portion so as to prevent axial movement of the rod with respect to the said one member except for movement permitted by deformation of the bumper mounted at the first apertured portion, a third stop on the rod engageable with the bumper mounted at the second apertured portion on the side away from the first apertured portion for limiting pivotal movement of the link member involving movement of the apertured portions away from one another, engagement of one of the first and second stops with the bumper mounted at the second apertured portion on the side toward the first apertured portion limiting pivotal movement of the link member involving movement of the apertured portions toward one another.

6. The combination specified in claim 1 and further including a coil spring surrounding the resilient masses and the rod and acting between the first and second members for urging the lower link downwardly.

7. The combination specified in claim 2, each member being at its opening displaced from the general plane of portions radially outwardly therefrom in a direction toward the other member, the combination further including a coil spring surrounding the rod and the resilient bumpers and seated on the said radially outward portions of the members for urging the link in a direction involving movement of the members away from one another.

8. The combination with a vehicle frame and a wheel-connected link pivotally attached to the vehicle frame, of means for providing a cushioned limit to movement of the link in one direction with respect to the vehicle frame, said means comprising bumpers having resilient portions, at least one bumper having a resilient face, inflexible means attaching one bumper to the frame and the other bumper to the link, each inflexible means being associated with one bumper so as to be farther from one side of the bumper face than from the other side thereof, the bumper faces being related to one another as to come into contact with one another only at a small area at the said one side upon a certain movement of the link in the said one direction, to increase their area of contact to completeness progressively toward the said other side upon further movement of the link in the said direction, and to maintain a constant complete area of contact upon still further movement of the link in the said one direction.

9. The combination with a vehicle and the lower link of a pair of links connected at one end to the vehicle frame and at the other end to a ground wheel, of means for limiting the movement of the pair of links in one direction with respect to the frame, said means comprising bumpers having resilient portions, at least one bumper having a resilient face, inflexible means attaching one bumper to the frame and the other bumper to the lower link, each inflexible means being associated with one bumper so as to be farther from one side of the bumper face than from the other side thereof, the bumper faces being related to one another as to come into contact with one another only at a small area at the said one side upon a certain movement of the links in the said one direction, to increase their area of contact to completeness progressively toward the said other side upon further movement of the links in the said direction, and to maintain a constant complete area of contact upon still further movement of the links in the said one direction.

10. The combination with a vehicle frame and a wheel-connected link pivotally attached to the vehicle frame, of means for limiting pivotal movement of the link with respect to the frame in two directions, said means comprising a first member attached to the link and having an opening, a second member attached to the frame and having an opening, first and second resilient bumpers mounted at the opening in the first member, respectively, at the side of the first member toward the second member and at the other side, third and fourth bumpers mounted at the opening in the second member, respectively, at the side of the second member toward the first member and at the other side, a rod extending through the openings in the members and the bumpers, first and second stops on the rod engaging the first and second bumpers, respectively, so as to prevent axial movement of the rod with respect to the first member and the link except for movement permitted by deformation of the first and second bumpers, the first and third bumpers and the first stop being so related to one another as to cause the first stop to come into contact with the third bumper over only a small area after a certain movement of the link in one direction, the area of contact between the first stop and the third bumper to increase to a maximum upon a further movement of the link in the said one direction, and the aforesaid area of contact to remain at a maximum upon a still further movement of the link in the said one direction, and a third stop on the rod related to the fourth bumper so as to contact the same over only a small area after a certain movement of the link in the opposite direction, to cause the area of contact between the third stop and the fourth bumper to increase to a maximum upon further movement of the link in the said opposite direction, and to cause the area of contact to remain at a maximum upon still further movement of the link in the said opposite direction.

11. The combination with a vehicle frame and the lower link of a pair of links connected at one end to the vehicle frame and at the other end to a carrying part for a ground wheel, of means for limiting movement of the pair of links in two directions with respect to the frame, said means comprising a first member attached to the lower link and having an opening, a second member attached to the frame and having an opening, first and second resilient bumpers mounted at the opening in the first member, respectively, at the side of the first member toward the second member and at the other side, third and fourth bumpers mounted at the opening in the second member, respectively, at the side of the second member toward the first member and at the other side, a rod extending through the openings in the members and the bumpers, first and second stops on the rod engaging the first and second bumpers, respectively, so as to prevent axial movement of the rod with respect to the first member and the link except for movement permitted by deformation of the first and second bumpers, the first and third bumpers and the first stop being so related to one another as to cause the first stop to come into contact with the third bumper over only a small area after a certain movement of the links in one direction, the area of contact between the first stop and the third bumper to increase to a maximum upon a further movement of the links in the said one direction, and the aforesaid area of contact to remain at a maximum upon a still further movement of the links in the said one direction, and a third stop on the rod related to the fourth bumper so as to contact the same over only a small area after a certain movement of the links in the opposite direction, to cause the area of contact between the third stop and the fourth bumper to increase to a maximum upon further movement of the links in the said opposite direction, and to cause the area of contact to remain at a maximum upon still further movement of the links in the said opposite direction.

12. The combination with a vehicle frame and a wheel-connected link pivotally attached to the vehicle frame, of means for limiting pivotal movement of the link in two directions with respect to the frame, said means comprising a first member attached to the link and having an opening, a second member attached to the vehicle frame and having an opening, first and second resilient bumpers, mounted at the openings in first member, respectively, at the side of the first member toward the second member and at the other side, the side of the first bumper nearer the pivotal mounting of the link being of less thickness than the other side, third and fourth resilient bumpers mounted at the opening in the second member, respectively, at the side of the second member toward the first member and at the other side, a rod extending through the bumpers and the openings in the members, first and second stops on the rod engaging the first and second bumpers, respectively, so as to prevent axial movement of the rod with respect to the first member except for that permitted by deformation of the first and second, the side of the third bumper toward the pivotal mounting of the link being of less thickness than the other side, the first and third bumpers being so related as to cause contact between the thick side of the third bumper and the portion of the first stop over the thick side of the first bumper after a certain movement of the link in one direction, to bring about an increase in area of the above contact to a maximum upon further movement of the link in the said one direction until contact is made between the thin side of the third bumper and the portion of the first stop over the thin side of the first bumper, and to maintain the maximum area of contact upon still further movement of the link in the said one direction, the fourth bumper being thinner at one side than at the other side, and a third stop on the rod situated with respect to the fourth bumper so as to come into contact therewith over a small area at only the thick side after a certain movement of the link in the opposite direction, to increase the area of contact between the third stop and the fourth bumper to a maximum including contact at the thin side of the fourth bumper upon further movement of the link in the said opposite direction, and maintaining the area of contact at the maximum upon still further movement of the link in the said opposite direction.

13. The combination with a vehicle frame and the lower link of a pair of links pivotally attached at one end to the vehicle frame and at the other end to a ground-wheel-carrying part, of means for limiting pivotal movement of the lower link in two directions with respect to the frame, said means comprising a first and second member secured to the lower link and the vehicle frame, respectively, and having openings, the portion of each member immediately surrounding the opening therein being displaced from the outer portions of the member toward the other member, first and second resilient bumpers mounted at the opening in the first member and the portion surrounding the opening, respectively, at the side of the first member toward the second member and at the other side, the side of the first bumper toward the pivotal mounting of the lower link being relatively thin and the opposite side relatively thick, the side of the second bumper toward the pivotal mounting being relatively thick and the opposite side relatively thin, third and fourth bumpers mounted at the opening in the second member and at the portion surrounding the opening, respectively, at the side toward the first member and at the opposite side, the side of the third bumper toward the pivotal mounting of the lower link being relatively thin and the opposite side relatively thick, the side of the fourth bumper toward the pivotal mounting of the lower link being relatively thick and the opposite side relatively thin, a rod extending through the bumpers and the openings on the members, first and second stops on the rod engaging the first and second bumpers, respectively, so as to prevent axial movement of the rod with respect to the first member except for that permitted by deformation of the first and second bumpers, the first and third bumpers being so related as to cause the thick side of the third bumper to come into contact with the portion of the first stop over the thick side of the first bumper after a certain movement of the lower link in one direction, the area of contact between the third bumper and the first stop to increase to the maximum including contact between the thin side of the third bumper and the portion of the first stop over the thin side of the first bumper upon a further movement of the lower link in the said one direction, and the area of contact to remain at the maximum upon a still further movement of the lower link in the said one direction, a third stop on the rod related to the fourth bumper so as to come into contact with the thick side of the fourth bumper after a certain movement of the lower link in the other direction, to increase to the maximum its area of contact with the fourth bumper including the thin side upon further movement of the lower link in the said other direction, and to maintain the area of contact at the maximum upon a still further movement of the lower link in the said other direction, and a coil spring surrounding the rod and the bumpers and engaging the outer portions of the members so as to urge the lower link in the said other direction.

FREDERIC W. SLACK.
CHESTER C. UTZ.